United States Patent [19]

Hirmann

[11] 4,244,113
[45] Jan. 13, 1981

[54] MEASURING ARRANGEMENT
[75] Inventor: Georg Hirmann, Zürich, Switzerland
[73] Assignee: Polyprodukte AG, Switzerland
[21] Appl. No.: 704,082
[22] Filed: Jul. 9, 1976

Related U.S. Application Data

[63] Continuation of Ser. No. 627,022, Oct. 29, 1975, abandoned.

[30] Foreign Application Priority Data

Oct. 29, 1974 [CH] Switzerland .................. 14508/74

[51] Int. Cl.² .................. G01B 9/00; G01B 11/275
[52] U.S. Cl. .................. 33/203.18
[58] Field of Search .................. 33/203.15–203.19

[56] References Cited
U.S. PATENT DOCUMENTS

| | | | |
|---|---|---|---|
| 2,595,604 | 5/1952 | Pascoe | 33/203.15 |
| 3,170,100 | 2/1965 | Rärtsch et al. | 33/125 C X |
| 3,417,479 | 12/1968 | Hirmann | 33/203.17 |
| 3,546,782 | 12/1970 | Pereue et al. | 33/203.17 X |
| 3,643,337 | 2/1972 | Dick | 33/203.18 X |
| 3,758,958 | 9/1973 | Jordan | 33/203.18 X |
| 3,855,709 | 12/1974 | Hirmann | 33/203.15 |

Primary Examiner—Charles E. Phillips
Attorney, Agent, or Firm—Craig & Antonelli

[57] ABSTRACT

A measuring apparatus for incrementally measuring the wheel inclination angles of vehicle wheels with the arrangement employing data emitters for converting the inclination angles into pulses proportional to such distances or angles. Each of the data emitters includes a movable scanning pin operatively connected with a photo-electric system cooperating with light rasters to generate pulses indicative of the measured angle of inclination. The generated pulses are fed to a pulse store device and/or an indicator device to provide an automatic visual indication of the camber, toe-in, caster and lock angle of the vehicle wheels.

23 Claims, 4 Drawing Figures

MEASURING ARRANGEMENT

This is a continuation of copending application Ser. No. 627,022 filed Oct. 29, 1975, now abandoned.

The present invention relates to a measuring arrangement, and more particularly, to a measuring arrangement for incrementally measuring the angle of inclination of vehicle wheels with the measurements being effected by data emitters which convert the inclination angle measured by feeler pins into pulses proportional to the measured distances or angles.

The positioning of king pins in a vehicle steering system is important for the driving behavior of the motor vehicle. The two dimensional inclination of the king pins in relation to a line perpendicular to the road surface is called a caster angle in one dimension and a king pin angle or inclination in the other dimension. Since the king pin is ordinarily not accessible, and therefore, not directly measurable, the calculation of the position of the king pin is ordinarily carried out in a steering geometry with the so-called caster angle deriving from a projection of the king pin angle upon a longitudinal plane of symmetry of the vehicle. However, it is also possible to ascertain the caster angle indirectly from the differences of two camber angles measured with symmetrical wheel deflection.

An incremental measuring apparatus has been proposed, for example, in U.S. Pat. No. 3,855,709, which measures the toe-in and camber angle of the vehicle wheels by means of four fixedly mounted scanning devices adopted for application to each of the respective wheels with each scanning device having a fixed and movable feeler pin. The movable feeler pin is provided with incremental notch units so that displacement of the feeler pin can be determined by incremental counting the incremental notch units cooperate with a photo-electric system to provide output signals indicative of the measured values to an appropriate indicating device.

A further measuring apparatus has been proposed in U.S. Pat. No. 3,417,479 wherein a control apparatus is operably connected to the undercarriage or chassis of a vehicle by means of mechanical feelers with the feelers during connection of the apparatus being operatively positively and synchronously moved with respect to the axis of symmetry of the control apparatus whereby the geometric characteristics of the apparatus are comparable with the geometric conditions of the chassis with each measurement being based upon the optical-mechanical or mechanically determined axis of symmetry of the chassis whereby, during each measurement, the position of the opposite geometrical vehicle axis is positively taken into account.

In such conventional measuring apparatuses, the measurement of the angular inclination of the vehicle wheels is somewhat complicated and time consuming and, likewise, in known measuring apparatuses wherein the caster angle is determined by the difference of two camber angle values the procedure is also time consuming since the camber angle must be balanced to zero each time.

The present invention is concerned with the task to provide a structurally simple measuring arrangement which operates reliably while eliminating the aforementioned shortcomings.

The underlying problems are solved according to the present invention in that a measuring arrangement is provided which includes a scanning device or measuring head having data emitters provided with range limit switches which switch the measuring apparatus on and off in a specific pivot range with the wheel inclination angles present at the limit positions of the pivot range being automatically recorded and indicated.

According to one feature of the present invention, during the pivoting movement of the front wheels, the camber angles of the wheels are incrementally measured and converted into pulses which are then fed to a data store device with the caster angles for each wheel being automatically determined from difference formations of the pulses indicative of the measured camber angles.

According to another feature of the present invention, the lock angle difference of the front wheel can also be measured automatically, in which case, during the pivoting movement of the front wheels, the lock angles of the wheels are measured incrementally with the measurements being converted into pulses which are fed to a data store arrangement wherein the lock angle difference for each of the wheels is automatically determined from the formation of differences in the values of the respective lock angles.

In accordance with the present invention, mechanical or photo-electric switches are assembled with the data emitter which photo-electric switches cooperate with light rasters to provide a pulse output to the data store and/or an indicator device. The data emitters can be used as range limit switches and may be provided with a fixedly arranged light raster and a switch range.

The photo-electric switch may be arranged, for example, on a rotatable arm or lever of the data emitter and may serve for scanning the light rasters and the switch range. Preferably, according to the present invention, the switch range is limited by a terminal area serving as a light mark on the passing over of which a photo-electric switch responds.

Advantageously, according to the present invention, the pulses generated by the photo-electric switches and light rasters are stored in a data storing device acting as a buffer with the differences between the fed pulses being determined by the data store device.

According to yet another feature of the present invention, an indicator device is provided which includes a direct current motor suitably connected through gearing or the like with an endless circulating belt cooperating with a fixed scale. The pulses from the data storing device and/or the data emitter are fed to the indicator device through suitable conducting lines to provide a visual display of the measured values.

Preferably, according to the present invention, the endless band is provided with optical rasters or apertures which serve as light marks converted by photo-electric switches into back signaling pulses fed to the data storing device. A further optical raster or aperture may be provided in the endless band which serves as a light mark for effecting the switching off of the direct current motor at a zero position of the band through a further photo-electric switch.

Preferably, in accordance with the present invention, the back signaling pulses issued by the photo-electric switch of the indicating device are fed to the data store device until the stored value becomes zero with the direct current motor halting the band to thereby indicate the measured value of the angle of inclination of the wheel in the rest condition of the indicator device.

Accordingly, it is an object of the present invention to provide a measuring arrangement for incrementally measuring the angles of inclination of vehicle wheels which arrangement avoids by simple means the aforementioned shortcomings and drawbacks encountered in the prior art. A further object of the present invention resides in providing a measuring arrangement which is relatively simple in construction and therefore relatively inexpensive.

A still further object of the present invention resides is providing a measuring apparatus whereby it is possible to obtain the caster angle of both front wheels of the vehicle instantaneously and automatically.

Still another object of the present invention resides in providing a measuring apparatus whereby the difference in lock angles of the front wheels can be measured automatically.

These and further objects, features and advantages of the present invention will become more apparent from the following description when taken in connection with the accompanying drawings which show, for the purposes of illustration only, several embodiments in accordance with the present invention, and wherein.

Figures 1, 2:
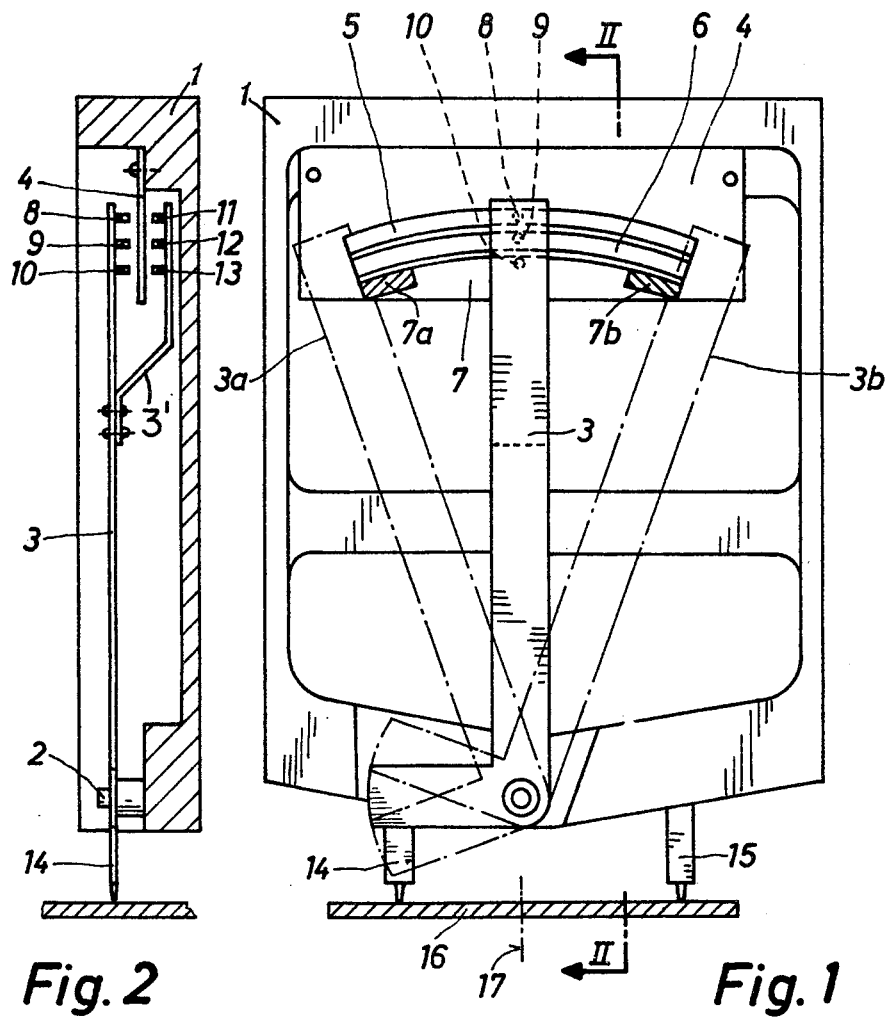
FIG. 1 is a side view of a measuring apparatus in accordance with the present invention.
FIG. 2 is a cross-sectional view taken along line II—II of FIG. 1.

Referring now to the drawings wherein like reference numerals are used throughout the various views to designate like parts, and more particularly, to FIGS. 1 and 2, according to these figures, a data emitter is provided which includes a housing 1 having an arm 3 rotatably or pivotally mounted about a pivot pin 2. One end of the arm 3 extends beyond the periphery or outer contour of the housing 1 and has provided thereon a scanning pin 14. The other end of the arm 3 sweeps over two arcuate light rasters 5, 6 which are arranged on a plate 4 or the like secured to the housing 1. The light rasters 5, 6 are each divided into incremental units or light marks so as to provide a pulse output when the rasters are swept by a photo-electric device. A switch range 7 is provided with two end areas 7a, 7b serving as light marks and range limit switches. The arm 3 may move over the end areas 7a, 7b into limit positions 3a, 3b indicated in phantom line in FIG. 1. The arm 3 may be formed with two integral tines or have a branched arm portion 3' secured thereto.

A scanning pin 15 is fixed on the housing 1 at a specific predetermined distance from the movable scanning pin 14 with the scanning pins 14, 15 being disposed substantially in the same plane. Photo-electric switches 8, 9, 10 are arranged on a first branch of the arm 3 with one switch being allocated to each light raster 5, 6 and one switch allocated to the switch range 7. Light sources 11, 12, 13 are arranged on the other branch 3' of the arm 3 behind the light rasters and switch range and are disposed so as to register with the respective switches 8, 9, 10. The photo-electric switch 10 sweeps the switch range 7 and when the photo-electric switch 10 enters the end areas 7a, 7b an interruption of the circuit is effected to provide a pulse output indicative of the respective position of the arm 3. By virtue of the flat construction of the data emitter of FIGS. 1 and 2, it is possible to assemble several emitters into one compact measuring head.

A measuring disk 16 is fitted on the axis 17 of each of the respective wheels to be measured and the fixed pin 15 and scanning pin are brought into engagement with the measuring disk so as to permit a measuring of the wheel inclination. As apparent the measuring disk 16 may be secured to the respective wheels by suitable clamping or affixing means (not shown). The wheel inclination as indicated by the inclination of the measurement disk 16 is measured by the displacement of the scanning pin 14 which displacement results in the generation of pulses indicative of the measured angle of inclination by virtue of the pivoting of the arm 3 and the displacement of the photo-electric switches relative to the light rasters 5, 6. The pulse output from the data emitter is then fed to a pulse counter and visually displayed on an indicator arrangement.

Figure 3:
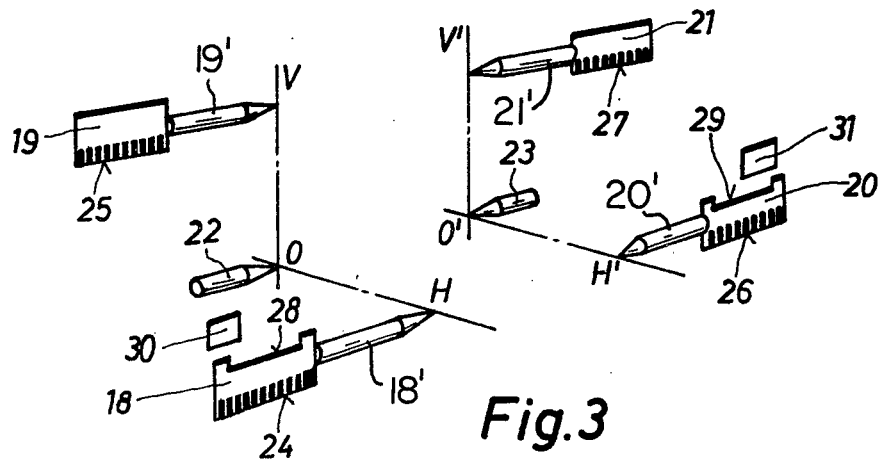
FIG. 3 is a schematic perspective view of a further embodiment of a measuring apparatus in accordance with the present invention.

According to FIG. 3, a scanning apparatus is provided having two measuring heads for scanning front wheels provided with measuring disks fitted on the front wheel axes. The first measuring head includes a common fixed scanning head 22 and a data emitter 18 for measuring the toe-in of a vehicle wheel. The data emitter 18 is spaced at a specific predetermined distance from the fixed scanning pin 22 along a horizontal H. A data emitter 19 is provided for measuring the camber angle of the vehicle wheel and is spaced from the fixed pin 22 by a specific predetermined distance along the vertical V.

The second measuring head includes a fixed scanning pin 23 with a data emitter 20 being positioned or spaced from the fixed pin 23 along a horizontal H' by a specific predetermined distance for measuring the toe-in of another vehicle wheel. A data emitter 21 is provided at the second head and arranged at a specific predetermined distance from the fixed pin 23 along the vertical V' for measuring the camber angle of the other vehicle wheel. The respective data emitters 18, 19, 20, 21 are installed in respective data heads and, in each case, only one fixed scanning pin 22, 23 is necessary for the respective heads.

Each of the data emitters 18, 19, 20, 21 include a movable scanning pin 18', 19', 20', 21' having a photo-electric switch which sweeps over a respective light raster 24, 25, 26, 27 in response to movement of the respective movable scanning pins. While the light rasters 24, 25, 26, 27 are schematically illustrated as being rectangular in configuration, in actual practice the respective rasters have an arcuate configuration such as shown in FIGS. 1 and 2. Furthermore, the respective movable scanning pins 18', 19', 20', 21', are arranged preferably on a pivotally mounted arm or lever with the photo-electric switches and light sources being provided on such pivotally mounted arm in the same manner as the pin 14, photo-electric switches and light sources of the data emitter of FIGS. 1 and 2.

The data emitters 18, 20 are provided for measuring the toe-in and include a switch range 28, 29 with the associated photo-electric switch being disposed in the manner of the switch range 7 of the data emitter of FIGS. 1 and 2. No switch ranges need necessarily be provided for the data emitters 19, 21 for measuring the camber angle of the respective front wheels.

In operation, the measurement of the toe-in is effected by bringing the respective measuring heads to the measuring disks of the wheels of the vehicle until the fixedly arranged scanning pins 22, 23 contact the respective measuring disks. The movement of the movable pins 18', 20' of the data emitters 18, 20 results in a displacement of the photo-electric switches relative to the light rasters 24, 26 thereby providing a pulse output indicative of the incremental measurements. The pulse output is fed to an indicator device which provides a visual read-out of the toe-in of the respective wheels.

The measurement of the respective camber angles is also effected at the same time as the toe-in with the movable pins 19', 21', of the data emitters 19, 21 providing a pulse output of the incremental measurements due to the displacement of the photo-electric switches relative to the light rasters 25, 27. The incremental pulse outputs are fed to an indicator device to provide a visual read-out of the measured camber values.

The measurement of castor angle is calculated from the camber measurements within a specific pivot range of the vehicle wheels. To effect such measurement the data emitters 19, 21 and range limit switches 30, 31 are utilized. Specifically, the steering wheel (not shown) of the vehicle is positioned with the wheels in a straightforward direction and the data emitters 18, 19, 20, 21 are displaced toward the respective wheels or measuring disks fastened thereto until the pins of the respective emitters contact the measuring disks or front wheels. The steering wheel is first turned a predetermined amount to the left and then turned to the right with the displacement of the steering wheel resulting in a displacement of the vehicle wheel and the movable pins of the data emitters. The steering wheel is preferably displaced between the angles of a $+5°$ and a $-5°$.

To provide an indication of the proper displacement of the steering wheel, a sensing device may be provided which includes a monitor lamp (not shown) or other signaling device which is activated when a predetermined displacement of the steering wheel is reached or exceeded. For example, the steering wheel may be turned to the left until the monitor lamp lights up and indicates that a lock angle of a $-5°$ has been exceeded and then turned to the right until the monitor lamp lights up indicating that a lock angle of a $+5°$ has been exceeded.

The displacement of the movable pins of the data emitters results in a sweeping over of the terminal area of the switch ranges 28, 29 whereby the associated range limit switches 30, 31 transmit pulses into a conventional pulse or data store device (not shown) wherein the pulses transmitted by the data emitters are counted and stored and the differences between the pulses at the respective angles of displacement of a $+5°$ and a $-5°$ for the respective wheels are formed or computed. The camber angle differences are fed from the pulse or data store device in the form of difference output pulses to an indicator device whereby such camber angle differences for each wheel are separately indicated on a separate scale of the indicating device. The respective values of the caster angles are determined by this process since the values of the caster angles are proportional to the camber angle differences.

The measurement of the lock angle difference of the steering wheel is effected in substantially the same manner as described hereinabove with the data emitters 18, 20 and range limit switches 30, 31 being utilized. Specifically, starting from a straightahead position of the front wheels, the vehicle steering wheel is first turned to the left with the monitoring lamp or light signaling a lock angle of a $-5°$ has been exceeded. Then the steering wheel is turned to the right by an angle of a $+5°$. The displacement of the movable pins of the data emitters results in a sweeping over of the terminal area of switch ranges 28, 29 whereby the associated range limit switches 30, 31 transmit pulses into a conventional pulse store device wherein such pulses are counted, stored and the lock angle differences are computed. Output pulses of the lock angle differences are then fed to an indicator device which indicates the lock angle differences on separate scales.

Figure 4:
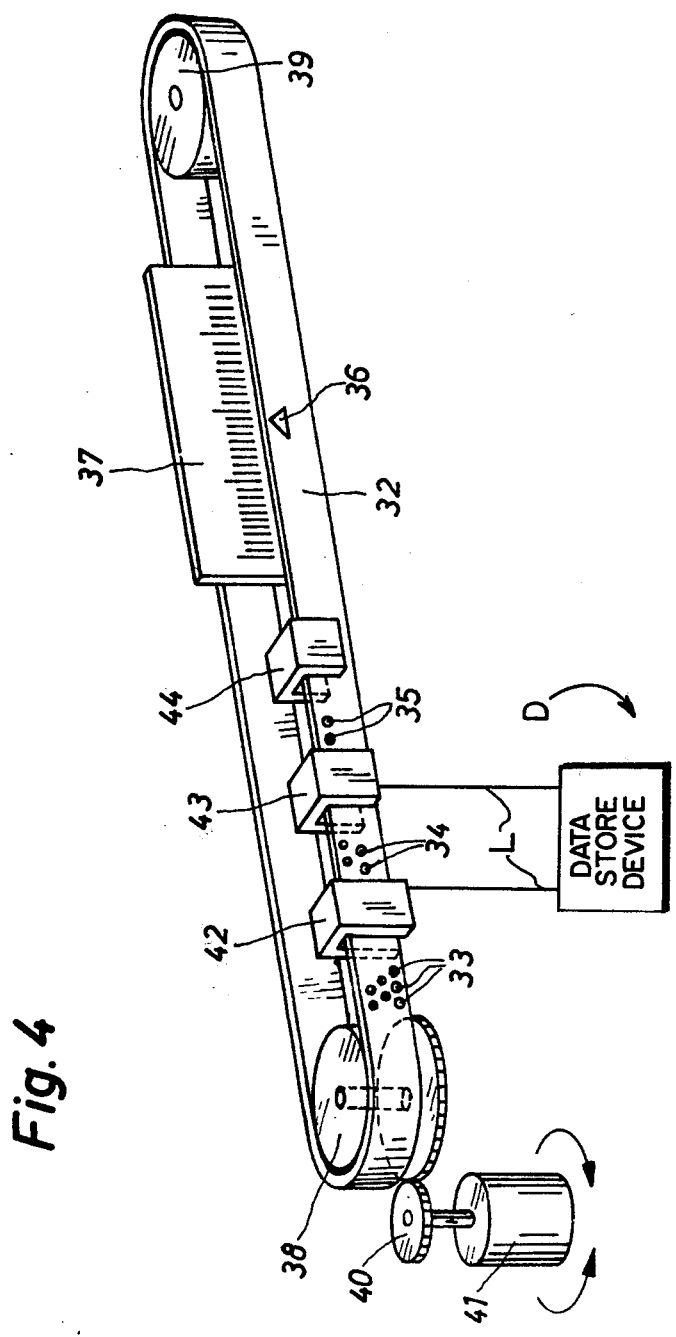
FIG. 4 is a somewhat schematic perspective view of an indicator device in accordance with the present invention.

According to FIG. 4, an indicator device is provided for giving a visual indication of the measured datum. The indicator device includes an endless circulating band 32 having two rows of perforations for apertures 33, 34 extending along the entire length thereof which perforations function as light rasters. Perforations or apertures 35 are also provided along the entire length of the circulating band 32 for halting the movement or displacement of the band 32. A fixed scale 37 is provided having appropriate indicia corresponding to the variable being measured and an index 36 is provided on the band 32 for registering with the indicia contained on the scale 37. The endless band 32 is guided over two rollers 38, 39 and is driven by a direct current motor through a gearing 40 or the like. Photo-electric switches 42, 43, 44 are provided and associated with the rows of perforations or apertures 33, 34, 35 respectively.

The indicator device of FIG. 4 operates in accordance with the principle of back signaling. Specifically, after the conclusion of measurements by the scanning heads or data emitters of FIGS. 1–3, the band 32 runs or is displaced back from the zero position and pulses generated by the perforation or apertures 33, 34 being swept by the photo-electric switches 42, 43 with the generated pulses being fed through signal leads L to the conventional or data store device generally designated by the reference character D until the pulses stored therein, indicative of the measured values, are canceled. Upon cancellation of the pulses in the pulse store device D, the indicator mark 36 then shows the values of, for example, the caster angle for one front wheel on the scale 37. A similar indicating device is provided and connected with the pulse store device D for indicating the caster angle of the other front wheel whereby the two data read-outs can be inspected at a glance and any asymmetry can immediately be ascertained. Likewise, the indicator device of FIG. 4 may be employed for indicating the lock angle differences of the steering wheel whereby a visual indication of the lock angle differences as measured by the data emitters 18, 20 is readily realized.

The correct sign of the data indicator on the indicator device is derived automatically from the direction of running of the endless band 32 as a result of the mutual offsetting of the perforations 33, 34 and the photo-electric switches 42, 43 which scan such perforations. As soon as the scanning head or data emitter is switched off or over, the endless band 32 runs to a zero position and comes to a halt as a result of the perforations or aperture 35 and photo-electric switch 44.

As apparent from the above description, the present invention provides a measuring and indicating arrangement wherein the range limit switches switch the measuring arrangement on and off in a specific pivoting range with the wheel inclination angles present at the limit positions of the pivoting range being automatically recorded and visually indicated.

While the data emitters of FIGS. 1-3 have been described as employing a photo-electric system for generating pulses indicative of the measured angle of inclination of the vehicle wheel, it is understood that a mechanical switch arrangement might also be provided to generate the measuring pulses.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An apparatus for measuring the angle of wheel inclination of vehicle wheels, the apparatus comprising: measuring means for obtaining a measurement of the angle of wheel inclination at each vehicle wheel, converting means connected with said measuring means for converting the measured angle of wheel inclination into a pulse proportional to the measured angle, and limit switch means for switching the measuring apparatus on and off in a predetermined measuring range whereby the wheel inclination angle at limit positions of the predetermined measuring range is automatically determined.

2. An apparatus according to claim 1, wherein said measuring means includes scanning pin means engageable with a measuring disk means provided at the vehicle wheels.

3. An apparatus according to claim 2, wherein a data store means is provided for receiving the pulses of the measured angle of wheel inclination, said data store means including means for determining a difference between pulses at the limit positions of the predetermined measuring range, said measuring means obtaining a measurement of a camber angle of the vehicle wheels, said converting means converting the measured camber angles into pulses and feeding said pulses to said data store means, said data store means counting and storing said pulses and computing the differences between said camber angles whereby the caster angles for each vehicle wheel are determined.

4. An apparatus according to claim 2, wherein the vehicle wheels are front vehicle wheels, said limit switch means defining a predetermined pivoting range of said front vehicle wheels, said measuring means obtaining a measurement of the lock angles of the front vehicle wheels, said converting means converting the measured lock angles into pulses indicative of such angles, and data store means for receiving the pulses of the measured lock angles, said data store means including means for computing a difference between the lock angle pulses at limit positions of the pivoting range of said front vehicle wheels whereby the lock angle differences for each front wheel is automatically determined.

5. An apparatus according to claim 2, wherein said converting means includes photo-electric switch means operable to generate pulses indicative of the measured angle.

6. An apparatus according to claim 2, wherein said converting means includes mechanically operable switch means for generating pulses indicative of the measured angles.

7. An apparatus according to claim 2, wherein said converting means includes a plurality of light raster means, photo-electric means are provided for scanning a respective one of said plurality of light raster means to generate pulses indicative of the measured wheel inclination angles.

8. An apparatus according to claim 7, wherein a housing means is provided for housing said measuring means, said converting means and said limit switch means, an arm means is pivotally mounted in said housing means, said scanning pin means being mounted on one end of said arm means, said photo-electric means being mounted on the other end of said arm means, said light raster means and said limit switch means being mounted in said housing means such that said photo-electric switch means sweeps said light raster means and said limit switch means as said arm means is pivoted by said scanning pin means.

9. An apparatus according to claim 8, wherein said limit switch means is defined by terminal areas formed as light marks, said photo-electric means scans said light marks of said limit switch means.

10. An apparatus according to claim 2, wherein a data store device is provided and connected to said converting means and said limit switch means to receive pulses therefrom, said data store means acting as a buffer and providing output pulses indicative of a difference in the pulses fed thereto.

11. An apparatus according to claim 10, wherein an indicator means is provided and connected to said data store means, said indicator means including means for producing back signal pulses, means for feeding said back signal pulses to said data store means until a stored value therein becomes zero, and means for switching off the drive means of said band when the stored value in said data store means becomes zero whereby the indicator means visually indicates the measured value when said band is stationary.

12. An apparatus according to claim 2, further comprising an indicator means connected to said converting means and said limit switch means for receiving pulses therefrom and for providing a visual indication of the measured values.

13. An apparatus according to claim 12, wherein said indicator means includes an endless band, and a drive means for driving said endless band to provide an indication of the measured values.

14. An apparatus according to claim 13, wherein said endless band includes a plurality of optical rasters serving as light marks, photo-electric means are provided for sensing said optical rasters and providing back signaling pulses.

15. An apparatus according to claim 14, wherein said endless band includes at least one further optical raster serving as a light mark, a further photo-electric switch means connected to said drive means is provided for sensing said further optical raster and switching said drive means off at a zero position of said endless band.

16. An apparatus according to claim 15, wherein said endless band includes at least one further perforation, a further photo-electric switch means connected to said drive means is provided for sensing said further perforation and switching off said drive means at a zero position of said endless band.

17. An apparatus according to claim 13, wherein said endless band includes a plurality of spaced perforations, and wherein photo-electric means are provided for sensing said spaced perforations and for producing back signaling pulses.

18. An apparatus according to claim 1, further comprising a housing means for housing said measuring means, said converting means and said limit switch means, said measuring means including a fixed scanning pin means mounted on said housing means and at least one movably mounted scanning pin means spaced from said fixed scanning pin means and disposed substantially in the same plane therewith, said converting means including at least one arm means pivotally mounted at said housing means, said at least one movable scanning pin means being provided on one end of said arm means so as to pivot the same, and photo-electric means provided on the other end of said arm means, said photo-electric means converting the displacement of said arm means by said movable scanning means into pulses indicative of the pivotal displacement of said arm means.

19. An apparatus according to claim 18, wherein a plurality of light rasters are fixedly mounted in said housing means, said photo-electric switch means includes photo-electric switches mounted on said arm means on one side of said light raster, and light source means provided on the other side of said light raster in alignment with said photo-electric switch means.

20. An apparatus according to claim 19, wherein said limit switch means includes a switch range defined by two terminal areas serving as light marks, and wherein a further photo-electric switch means is provided on said arm means for scanning said switch range.

21. An apparatus according to claim 18, wherein two movably mounted scanning pins are provided, each of said movably mounted scanning pins being spaced from said fixedly mounted scanning pin by a predetermined distance, a first of said movably mounted scanning pins being disposed along a horizontal line extending through said fixed scanning pin and said first movably mounted scanning pin, the second of said movably mounted scanning pins being disposed along a vertical line extending through said fixed scanning pin and said second movably mounted scanning pin, a pair of arm means pivotally mounted in said housing means, each of said arm means having one of said movably mounted scanning pins mounted on at least one end thereof, photo-electric means provided at the other end of the respective arm means, said photo-electric means converting the displacement of the respective arm means into pulses indicative of the pivotal displacement of said arm means.

22. An apparatus according to claim 21, wherein a plurality of light rasters are fixedly mounted in said housing means, said photo-electric means on each of said arm means including photo-electric switches disposed on one side of said light rasters, and light source means provided on the other side of said light rasters in alignment with said photo-electric switches.

23. An apparatus according to claim 22, wherein said limit switch means includes a switch range defined by two terminal areas serving as light marks, a further photo-electric means is provided on one of said arm means for scanning said switch range.

* * * * *